US005646737A

United States Patent [19]

Levarlet et al.

[11] Patent Number: 5,646,737

[45] Date of Patent: Jul. 8, 1997

[54] DEVICE AND METHOD FOR OPTIMIZING A GIVEN PARAMETER IN A PROCESS OF COATING A SUPPORT WITH A LIQUID COMPOSITION

[75] Inventors: Christophe Georges Claude Levarlet, Saint Germain du Plain, France; Douglas Scott Finnicum, Webster; Robert Richard Quiel, Penfield, both of N.Y.

[73] Assignee: Eastman Kodak Company, Rochester, N.Y.

[21] Appl. No.: 645,466

[22] Filed: May 13, 1996

[30] Foreign Application Priority Data

Jul. 7, 1995 [FR] France .................................. 95 08575

[51] Int. Cl.$^{6}$ .................................................... G01N 21/84

[52] U.S. Cl. ...................................... 356/429; 250/559.01

[58] Field of Search .................................... 356/429, 430, 356/431, 444, 237; 250/572, 562, 561, 563, 571, 548, 557; 427/420; 118/410, 411

[56] References Cited

U.S. PATENT DOCUMENTS

| | | | |
|---|---|---|---|
| 3,835,332 | 9/1974 | Bridges | 250/563 |
| 4,680,205 | 7/1987 | Lerner et al. | 428/29 |
| 4,709,157 | 11/1987 | Shimizu et al. | 250/572 |
| 4,938,601 | 7/1990 | Weber | 356/429 |
| 4,987,440 | 1/1991 | Benker et al. | 355/41 |
| 5,143,758 | 9/1992 | Devine | 427/420 |
| 5,154,951 | 10/1992 | Finnicum et al. | 427/402 |
| 5,243,402 | 9/1993 | Weber et al | 356/429 |
| 5,293,214 | 3/1994 | Ledger | 356/355 |

FOREIGN PATENT DOCUMENTS

| | | |
|---|---|---|
| 0 477 932 A1 | 4/1992 | European Pat. Off. . |
| 0 566 504 A1 | 10/1993 | European Pat. Off. . |
| 0 640 878 A1 | 1/1995 | European Pat. Off. . |
| 1482462 | 8/1977 | United Kingdom . |

*Primary Examiner*—Frank G. Font
*Assistant Examiner*—Michael P. Stafira
*Attorney, Agent, or Firm*—Clyde E. Bailey, Sr.

[57] ABSTRACT

The invention aims to optimize a given parameter of a process of coating a support with a liquid composition. The device comprises: a) means (9, 10) for varying the parameter according to a predetermined profile; b) first detection means (11) for producing a first density profile for the support (6) across the width of the support, as the parameter varies; c) second detection means (13) for producing a second density profile for the support (6) parallel to the longitudinal axis, as the parameter varies; and d) means (15, 10) for determining a range of values for the said parameter for which the first and second profiles are satisfactory.

25 Claims, 3 Drawing Sheets

DEVICE AND METHOD FOR OPTIMIZING A GIVEN PARAMETER IN A PROCESS OF COATING A SUPPORT WITH A LIQUID COMPOSITION

FIELD OF THE INVENTION

The invention concerns the field of processes for coating a moving support with a liquid composition, and concerns in particular photographic coating (or layering) processes where the thickness of the photographic composition deposited on a support must be as uniform as possible. The process and device according to the invention can advantageously be used in any process for coating a support in which the uniformity of the coating is critical for the quality of the final product.

BACKGROUND OF THE INVENTION

In the field of the photographic industry, for example, there exist a certain number of parameters which are considered as having substantial influence on the uniformity of coating. The principal examples would be the suction (the negative pressure applied close to the point of application of the liquid composition on the support so as to assist the application to the support of the meniscus or liquid bridge formed between the lip of the coating station and the cylinder on which the support is driven), the viscosity of the photographic composition, the speed of movement of the support and the distance between the coating station and the cylinder on which the support to be coated is driven. Non-uniformities of coating result in lines, streaks, bubbles or other defects on the photographic film, substantially affecting the sensitometric properties of the photographic film. Thus, for example, suction is an important parameter in the process of photographic coating. This is because too high a negative pressure will result in a rupturing of the meniscus, while too low a negative pressure will produce an entrainment of air, the two situations being highly detrimental to the uniformity of the photographic coating. It is thus very important to adjust this parameter precisely.

Traditionally, adjustments were made to the photographic coating process parameters on the basis of dry samples of the coated support, which underwent a qualitative evaluation by an operator, and this for a plurality of values of the parameter. The same taking of dry samples and the same qualitative evaluations were carried out while successively varying different parameters of the process. On the basis of all the dry samples thus taken, a "coating map" is produced, on the basis of which the value (or range of values) of each of the parameters studied for which the coating appears most uniform is determined. There are a number of drawbacks with this technique. Firstly, the measurement is supported on a qualitative examination and consequently presents problems of precision. Furthermore, this technique requires a large quantity of dry samples of photographic films to be stored. Finally, this approach does not enable the stability of the meniscus or liquid bridge to be measured, the latter characteristic influencing the uniformity of the coating along the length of the support.

SUMMARY OF THE INVENTION

Thus one of the objects of the present invention is to provide a method and a device enabling the parameters of a process of coating a support by means of a liquid composition to be optimized, not exhibiting the drawbacks mentioned above with reference to the conventional techniques. Other objects of the present invention will appear in detail in the description that follows.

These objects are achieved according to the present invention by producing a device for optimizing a given parameter of a process of coating, with a liquid composition, a support driven along its longitudinal axis, the device comprising:

a) means for varying the said parameter according to a predetermined profile;

b) first detection means for producing a first density profile for the support across the width of the support, after the liquid composition has been deposited and as the parameter varies;

c) second detection means for producing a second density profile for the support parallel to the longitudinal axis, after the liquid composition has been deposited and as the parameter varies; and d) means for analyzing the first and second density profiles and determining a range of values for the parameter for which the first and second profiles are satisfactory.

According to the present invention, a method is also provided for optimizing a given parameter of a process of coating, with a liquid composition, a support driven along its longitudinal axis, the method comprising the following steps:

a) varying the parameter according to a predetermined profile;

b) producing a first density profile for the support across the width of the support, after the liquid composition has been deposited and as the parameter varies;

c) producing a second density profile for the support parallel to the longitudinal axis, after the liquid composition has been deposited and as the parameter varies; and d) analyzing the first and second density profiles and determining a range of values for the parameter for which the first and second profiles are satisfactory.

BRIEF DESCRIPTION OF THE DRAWINGS

In the detailed description that follows, reference will be made to the drawings in which.

DETAILED DESCRIPTION OF THE DRAWINGS

Figure 1:
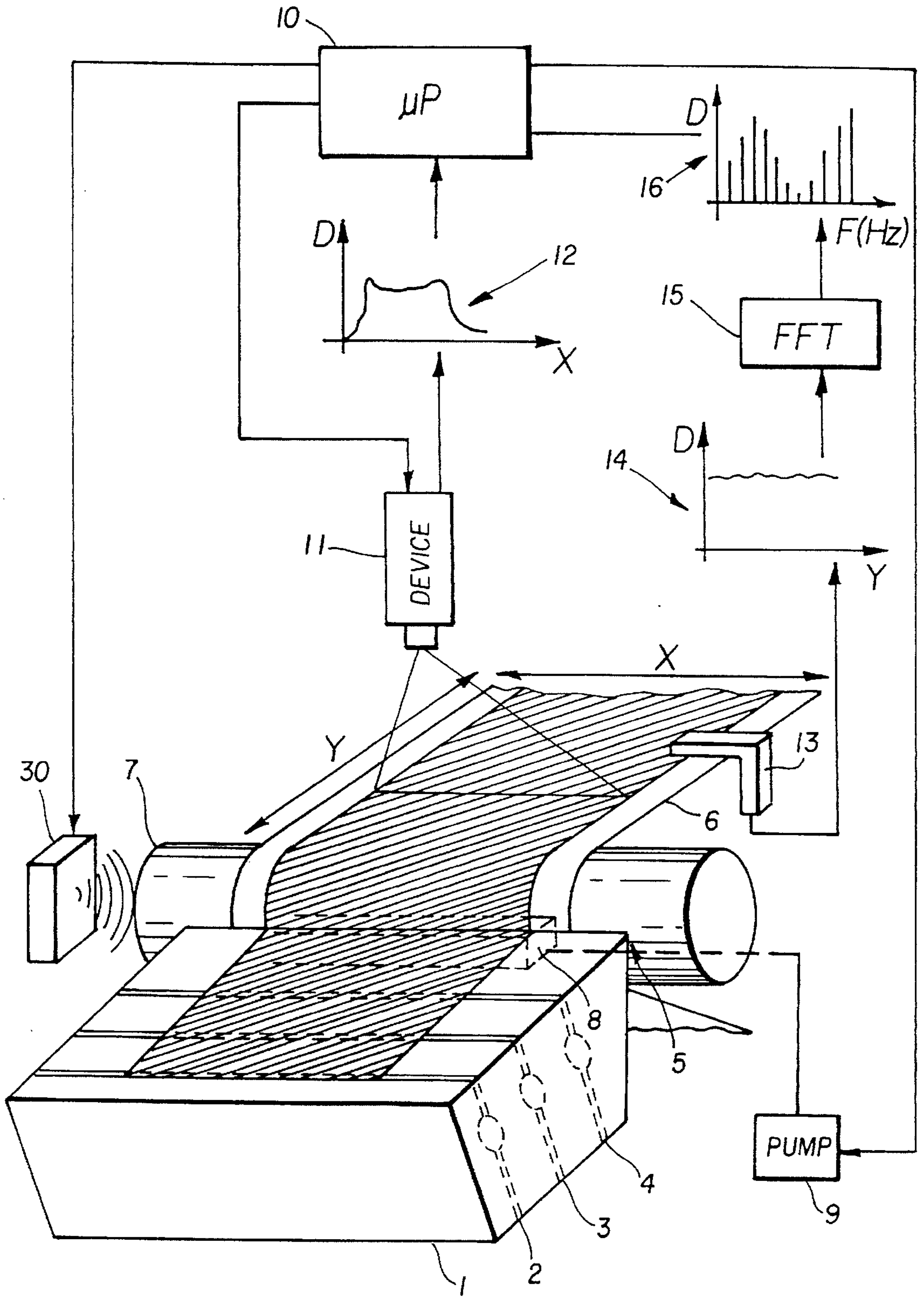
FIG. 1 depicts diagrammatically a preferred embodiment of the device according to the invention.

The device depicted in FIG. 1 comprises a coating device 1 of the meniscus type, having a slide surface onto which there flows a composition of at least one photographic layer (three, in the example depicted) coming from three feed slots 2, 3 and 4. The liquid composition leaves the slide surface at a lip 5 and is deposited on a support 6 moving in the vicinity of the lip on a cylinder 7. The liquid composition forms, at the interface between the lip 5 and the cylinder 7, a meniscus or liquid bridge whose application to the support is assisted by a suction device 8 designed so as to enable a negative pressure to be applied at the lip/cylinder interface over substantially the whole coating width. The suction device takes the form of a box 8 connected to a pump 9, which is controlled by a microprocessor 10 so that the level of vacuum applied can be varied according to a predetermined profile. This control of the negative pressure will be explained in more detail later.

The system according to the invention comprises a device 11 enabling a first density profile 12 to be produced for the coated support across the width of the support (axis X) as the suction applied to the meniscus is varied. Typically, a CCD camera (with inactinic radiation such as infrared in the case of a light-sensitive support) is used, having an array of CCD sensors aligned along the axis X for obtaining a high-resolution analysis of the density of the coated support over substantially the whole of its width. By way of example, for a coated width of around 10 cm, an array of 1024 pixels is used; the acquisition time is around 250 ms; the transfer time to the computer 10 is around 500 ms, the portion of film passing under the array of CCD sensors during the transfer of the data to the computer being "unseen" by the camera. Such a measurement across the width efficient reveals coating defects such as lines or streaks caused by entrainment of air, breaks in the meniscus, or by a particle trapped on the flow plane of the coating device, etc. Typically, over an average period of around 80 seconds, 256 density profiles are produced. The profiles obtained for different values of the parameter examined can then be placed end to end so as to form an image in three dimensions (X=width of support; Y=value of parameter; Z=density of coating) representing the evolution of the profile according to the value of the parameter, the grey levels of the image being representative of the density of the support (a white area indicates the absence of liquid on the film, due, for example, to a break in the meniscus). The image produced by the CCD camera can then be processed by means of an algorithm enabling the defects to be quantified according to the value of the parameter examined (here, in this instance, suction). Such image processing algorithms are well known and consequently require no additional detailed description.

According to another embodiment, and so as to reduce the surface not examined by the CCD camera, a system is used which has two arrays of CCD sensors offset in the direction of the length of the film and controlled so that the acquisition of data by one of the arrays takes place during the transfer of data to the computer 10 by the other, thus enabling, for a given length of film, the number of profiles produced to be multiplied.

The system in accordance with the invention also includes a device 13 enabling a density profile 14 of the coated support to be produced along the length of the support (i.e. parallel to the axis Y) as the value of the parameter to be examined varies. By way of example, an optical densitometer disposed opposite a portion of the width of the coated support is used. Typically, such a densitometer comprises a first light-emitting diode designed to emit radiation (in the case of a light-sensitive support, an inactinic radiation such as, for example, infrared radiation is used) over a portion of the support (around 2.5 cm wide). In reality, a light-emitting bar or a plurality of diodes disposed side by side are preferably used, so as to cover a greater width of the support. The radiation is reflected by the surface of the support and recovered by a detector, placed on the same side of the support as the light-emitting bar, the quantity of radiation measured being representative of the density of the coated support. Alternatively, a densitometer of the transmission type is used in place of a densitometer of the reflection type, the detector then being placed on the other side of the support. A continuous density profile 14 is thus produced for the coated support along the length as suction varies. In a general manner, the density profile along the length enables the stability of the meniscus to be measured, and, amongst other things, enables breaks in the meniscus due to excessively strong suction or insufficient suction to be detected.

Advantageously, the time response produced by the densitometer 13 is converted to a frequency response 16 by means of a fast Fourrier transformation algorithm 15. These algorithms for conversion to frequency response are well known and consequently require no additional detailed description. The conversion to a frequency response enables the frequencies disturbing the stability of the meniscus to be shown up. By way of indication, over a period of 80 seconds, about one hundred Fourrier spectra are recorded, which are then grouped together to form an image of the frequency response of the photographic film to the disturbance applied. In the example of photographic coating, the disturbance frequencies do not generally exceed 400 Hz. For this reason, the analog signal produced by the densitometer 13 is sampled at 1 KHz, thereby permitting a high-resolution analysis of the density of the support along its length, which resolution is quite sufficient for the range of frequencies to be detected. According to a particular embodiment, the amplitude of the disturbances corresponding to each of the frequencies measured is obtained by a root mean square value (RMS) calculation.

In the image, the frequency response translates into a succession of more or less dark fields, the grey levels of the image being representative of the intensity of the different frequency peaks: a dark field corresponds to a low-level peak; a lighter field corresponds to a higher level.

Figure 2:
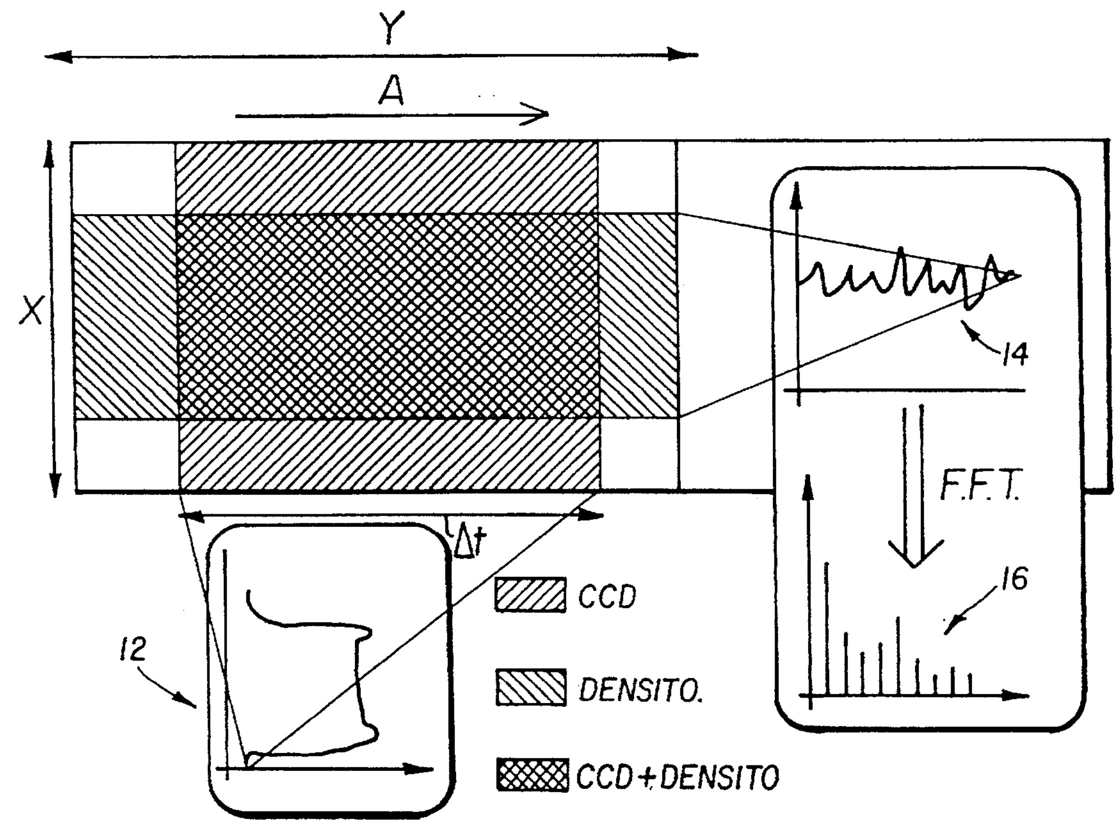
FIG. 2 illustrates by way of example the respective coverage levels of the different detection means used in the device in FIG. 1.

FIG. 2, to which reference is now made, illustrates diagrammatically the respective areas of cover of each of the density measurement means 11 and 13. The profile 12 corresponds to the density profile over substantially the whole width X of the support for an integration period Δt of the CCD array of around 250 ms. The profile 14 corresponds to the density profile measured by the densitometer 13 along the length Y of the support. The direction of travel of the film is depicted by the arrow A. As is seen from FIG. 2, some areas of the support are examined only by the CCD camera (the densitometer "sees" only a small width of the support (≈2.5 cm)), others are examined only by the densitometer (the CCD camera does not "see" the support during the period of transfer to the computer), and others are analyzed by the two instruments at the same time. As will be seen in greater detail below, the parameter examined is optimized by combining the density profiles obtained on the areas of the support seen at the same time by the CCD camera and the densitometer. These coverage levels can be optimized according to the nature of the application, notably by altering the performances of the measurement means used (integration and transfer time for the CCD camera; width of densitometer, sampling frequency of the signal coming from the densitometer, etc).

As mentioned previously, the density profiles obtained along the length and across the width are superimposed and combined as the parameter being studied varies. A range of values of the parameter is then determined within which the two density profiles are satisfactory, the optimum range of values being the range in which the image coming from the CCD camera does not exhibit major visible defects, and in which the stability in the frequency range is at its maximum. This determination of the optimum range can be produced in various ways: either in an automated manner by means of calculation and image processing algorithms; or manually through observation of the two images by an operator.

FIGS. 3A–3E show various possible profiles of variation in the value of the negative pressure applied to the meniscus. In the examples illustrated, the profile of variation of the negative pressure is produced over a period of time which is around 80 seconds.

Figure 3A:
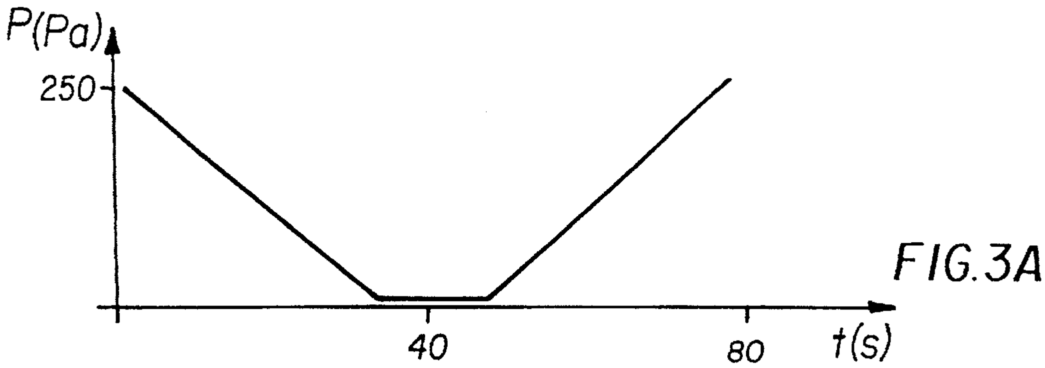
FIGS. 3A–3E depict diagrammatically various possible profiles of variation in the parameter observed.

According to the profile in FIG. 3A, the pressure decreases linearly from 250 Pa to a value close to 0, then is stable for a short period of time, and finally increases linearly to around 250 Pa. The increase and decrease profiles are substantially symmetrical, for reasons of hysteresis. Such a profile of variation is particularly sensitive to breaks in the meniscus due to insufficient suction. According to the profile in FIG. 3B, the pressure increases linearly to 250 Pa, then is stable for a short period of time, and finally decreases linearly to a value substantially equal to 0. Such a profile of variation is particularly sensitive to breaks in the meniscus due to excessively strong suction.

Figure 3B:
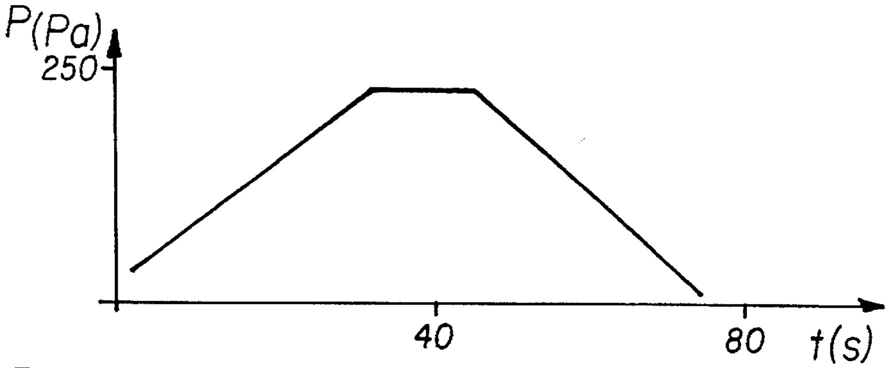
Figure 3C:
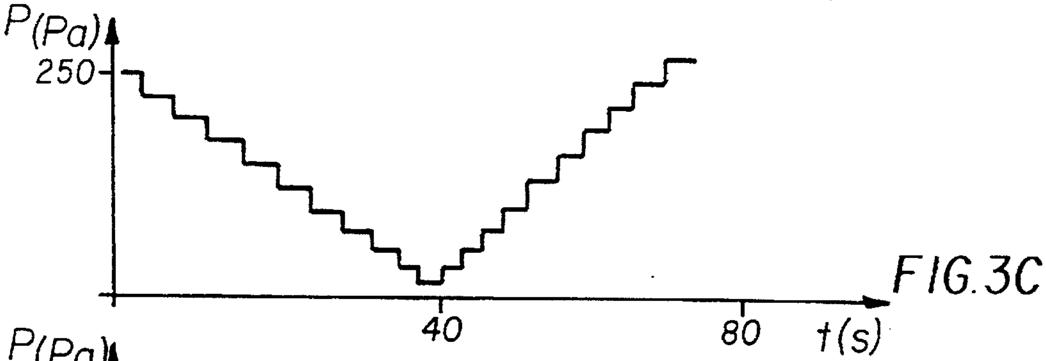
Figure 3D:
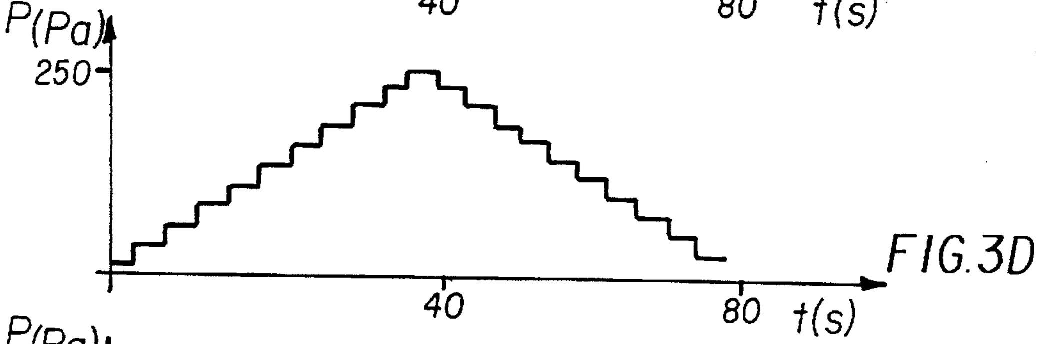

The profiles depicted in FIGS. 3C and 3D are equivalent, respectively, to the profiles of FIGS. 3A and 3B, except for the fact that the increase and decrease in the value of the parameter take place in a stepwise manner. Such profiles have the advantage of offering greater precision in the calculation of the fast Fourrier transform used to determine the frequency response of the densitometer.

Figure 3E:
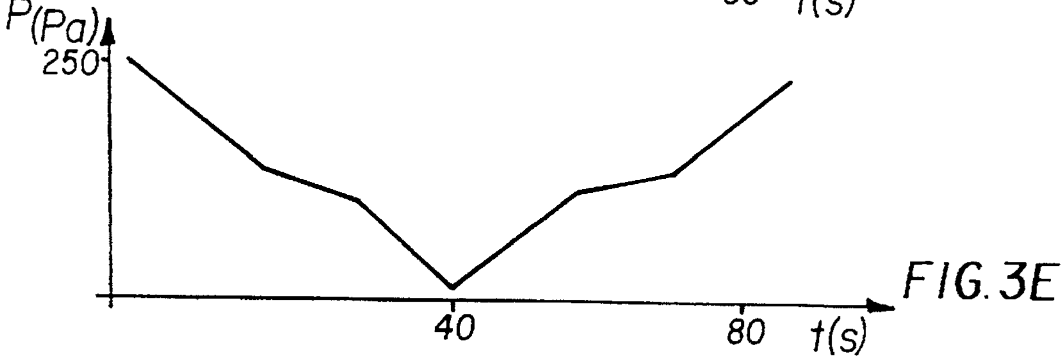

The profile depicted in FIG. 3E is characterized in that the value of the parameter increases/decreases in a slope variable according to its value. The latter type of profile makes it possible to go faster for certain values of the parameter (weak and strong suction) for which the probability of having optimum coating conditions is low, and to go more slowly for certain values of the parameter (moderate suction) for which the probability of having optimum coating conditions is greater. The latter approach enables the determination of the optimum interval to be refined. It is evident that each of the profiles depicted in FIGS. 3A–3D can exhibit this type of variation with a variable slope.

Still other profiles can be envisaged, depending on the parameter to be optimized. In fact, in the case of photographic coating, this optimization process could be applied in the same manner to the viscosity value of the photographic composition, to the speed of travel of the film, to the feed rates of the coating device for the different coatings, to the distance between the lip 5 and the support 6, etc.

Advantageously, and in order to optimize the results of the Fourrier transform, a controlled frequency disturbance (a series of sinusoidal disturbances with known frequencies) in a given range of frequencies are superimposed on the profile of variation of the parameter to be observed. The latter characteristic enables the frequencies amplified by the coating system to be determined for each value of the parameter observed, and this on the basis of the frequency response corresponding to the density profile along the length. To this end, and in order to calculate for each frequency (or frequency range) the gain in power of the device, the ratio of the power function of the system response to the power function of the excitation applied is calculated, frequency by frequency. Typically, in the case of a photographic coating device, the disturbance is situated in a frequency range lying between 0 and 400 Hz. For this type of application, the suction is disturbed by using, for example, a loudspeaker 30 disposed near to the suction box and controlled by a computer 10.

Alternatively, the disturbance is applied to other parameters of the system. For example, a frequency disturbance is applied to one or other of the pumps supplying the slots of the coating device, by means of a vibrating pot. Alternatively again, the controlled disturbance is applied to the speed of the cylinder.

As mentioned previously, the coating devices used notably in the photographic industry are devices which enable one or more layers to be applied to a support. According to the present invention, it can be worthwhile either to measure the overall response of the system, that is to say of all the layers, or to measure the response of only one or other of the layers. To this end, when the overall response of the system is to be measured, all the layers are greyed (by means of carbon black incorporated into gelatine). On the other hand, when the behavior of a particular layer is to be observed, only the layer to be observed contains carbon black.

The invention that has just been described is particularly advantageous in that it affords, at a relatively low cost, a qualitative and quantitative measurement of the uniformity of the coating, both across the width of the support and along its length, and this in a manner that is perfectly reproducible, owing to the reproducibility of the profile of variation of the parameter examined. It also enables the severity of the defects present on the support to be measured with precision.

The invention has been described with reference to preferred embodiments. It is evident that variations can be made thereto without departing from the spirit of the invention as claimed hereinafter.

We claim:

1. Device for optimizing a given parameter of a process of coating, with a liquid composition, a support driven along its longitudinal axis, the device comprising:

a) means for varying the said parameter according to a predetermined profile;

b) first detection means for producing a first density profile for the support across the width of the said support, after the liquid composition has been deposited and as the parameter varies;

c) second detection means for producing a second density profile for the support parallel to the said longitudinal axis, after the liquid composition has been deposited and as the parameter varies; and d) means for analyzing said first and second density profiles and determining a range of values for said parameter for which said first and second profiles are satisfactory.

2. Device according to claim 1, characterized in that:

i) the first detection means comprise a plurality of sensors distributed over substantially the whole width of the support so as to provide a high-resolution analysis of the transverse density of the support; and ii) the second detection means comprise a sensor disposed so as to measure the density of the support over a part of its width, at a frequency allowing a high-resolution analysis of the longitudinal density of the support.

3. Device according to claim 1, characterized in that said coating process is a process of photographic coating in which at least one layer of a photographic composition is deposited on a support at a coating station, said coating station comprising a lip, at which the photographic composition leaves the coating station, forming a meniscus to be deposited on the support, said support being driven on a cylinder disposed near to the lip, a negative pressure being applied between the lip and the cylinder so as to assist the application of the meniscus to the support.

4. Device according to claim 3, characterized in that said parameter is the value of the negative pressure applied between the lip and the cylinder.

5. Device according to claim 3, characterized in that said parameter is the speed of travel of the support on the cylinder.

6. Device according to claim 3, characterized in that the said parameter is the viscosity of the photographic composition.

7. Device according to claim 3, characterized in that said parameter is the distance between the lip and the cylinder.

8. Device according to claim 1, characterized in that the first detection means comprise a linear CCD camera.

9. Device according to claim 1, characterized in that the second detection means comprise an optical densitometer.

10. Device according to claim 1, characterized in that the analysis means comprise means for transforming the time response of the second detection means into a frequency response.

11. Device according to claim 10, characterized in that it also comprises means for superimposing on the profile of variation of said parameter a controlled frequency disturbance in a range of given frequencies, means being provided for, on the basis of said frequency response, calculating the amplification of said disturbance by frequency range.

12. Method for optimizing a given parameter of a process of coating, with a liquid composition, a support driven along its longitudinal axis, the method comprising the following steps:

a) varying said parameter according to a predetermined profile;

b) producing a first density profile for the support across the width of the support, after the liquid composition has been deposited and as the parameter varies;

c) producing a second density profile for the support parallel to said longitudinal axis, after the liquid composition has been deposited and as the parameter varies; and d) analyzing said first and second density profiles and determining a range of values for the said parameter for which said first and second profiles are satisfactory.

13. Method according to claim 12, characterized in that said coating process is a photographic coating process in which at least one layer of a photographic composition is deposited on a support at a coating station, said coating station comprising a lip at which the photographic composition leaves the coating station, forming a meniscus to be deposited on the support, said support being driven on a cylinder disposed near to the lip, a negative pressure being applied between the lip and the cylinder so as to assist the application of the meniscus to the support.

14. Method according to claim 13, characterized in that the value of the negative pressure applied between the cylinder and the lip is varied according to a predetermined profile.

15. Method according to claim 13, characterized in that the speed of travel of the support on the cylinder is varied according to a predetermined profile.

16. Method according to claim 13, characterized in that the viscosity of the photographic composition is varied according to a predetermined profile.

17. Method according to claim 13, characterized in that the distance between the lip and the cylinder is varied according to a predetermined profile.

18. Method according to claim 12, characterized in that the said predetermined parameter variation profile includes a first portion during which the parameter value decreases and a second portion during which the parameter increases substantially symmetrically with respect to the first portion.

19. Method according to claim 12, characterized in that the said predetermined parameter variation profile includes a first portion during which the parameter value increases and a second portion during which the parameter decreases substantially symmetrically with respect to the first portion.

20. Method according to claim 18, characterized in that said parameter decreases/increases in a substantially linear manner.

21. Method according to claim 18, characterized in that each of said first and second portions have several linear areas with different respective slopes.

22. Method according to claim 18, characterized in that said first and second portions are separated by a level stage during which the said parameter is kept substantially constant.

23. Method according to claim 18, characterized in that said parameter decreases/increases in a stepwise manner.

24. Method according to claim 12, characterized in that the said second density profile is converted to a frequency response.

25. Method according to claim 24, characterized in that it also comprises the following steps:

i) superimposing on the profile of variation of said parameter a controlled frequency disturbance in a range of given frequencies; and ii) from said frequency response, calculating the amplification of the disturbance by frequency range.

* * * * *